United States Patent Office 2,800,452
Patented July 23, 1957

2,800,452
STABILIZED HYDROCARBON COMPOSITIONS

Arnold A. Bondi, Oakland, and Herbert A. Newey, Lafayette, Calif., assignors to Shell Development Company, New York, N. Y., a corporation of Delaware No Drawing. Application July 12, 1954,
Serial No. 442,918

9 Claims. (Cl. 252—51.5)

This invention relates to improved hydrocarbon compositions, and particularly to compositions of the type of fuels, lubricants and greases, comprising predominately hydrocarbons, which are improved by the incorporation of an improving agent.

Various types of substances, both metal-containing, ash-forming and non-metal-containing, completely combustible, have been proposed for the improvement, in one or more respects, of hydrocarbonaceous compositions. Among these are to be found certain classes of high molecular weight polymeric organic substances which contain various polar functional groups. However, in order to utilize these polypolar substances in hydrocarbons, it is required that the substance possess a certain degree of oil-solubility. In order to provide this oil-solubility, while at the same time providing an effective proportion of effective polar groups, oil-solubilizing groups have been provided in the form of higher molecular weight alkyl radicals combined as ester with acyl radicals of the polymer chain, as by utilizing esters such as lauryl acrylate as one of the monomers in the copolymerization. In addition to being subject to hydrolytic cleavage, thereby losing its oil-solubility, even though the rate of such hydrolysis is less than that of ester groups of lower alcohols, e. g. of polymers of methyl acrylate, the hydrolytic cleavage of the oil-solubilizing group converts the carboxylate ester group to a corrosive carboxylic acid group.

It is an object of the present invention to provide hydrocarbon compositions having improved characteristics, such as oxidation stability, and stability against sludge formation. It is a further object to provide improved fuel oil which are resistant to screen-clogging. A further object is to provide hydrocarbon oils which have enhanced detergency and anti-wear properties. A still further object is to provide hydrocarbon fuel oils having improved color stability. A more specific object is to provide hydrocarbon compositions which are improved in utility by the presence of a minor amount of a non-metal-containing, completely combustible, oil-soluble organic substance which contains a plurality of polar, functional groups and contains a plurality of oil-solubilizing groups which are highly resistant to hydrolytic cleavage and which, even when some of them become hydrolyzed, leave in the substance, by hydrolysis, only chemically inactive groups. These objects will be more fully understood and others will be apparent from the description of the invention.

It has now been found that hydrocarbon compositions are improved with respect to one or more of the properties which are important to their utility, such as resistance to oxidative deterioration, resistance to sludging and filter-clogging, detergency, wear inhibition, corrosion inhibition, and the like, by the incorporation therein of a minor amount of a polysubstituted higher essentially normal alkane containing a plurality of oil solubilizing radicals stably bonded to the alkane against hydrolysis such as hydrocarbyl radicals of at least eight carbon atoms, and a plurality of N-polar-substituted carbamyl of thiocarbamyl radicals, these substituent radicals being attached to a plurality of the alkane carbon atoms throughout the length thereof.

In general, suitable polysubstituted normal alkanes which are effective to attain the objectives of the invention are obtainable by (I) copolymerizing (1) an ethylenically unsaturated monomer having a single $CH_2=CH-$ ethylenic group which is in a terminal position and has an uninterrupted chain of at least 8 carbon atoms in addition to the terminal vinyl group and (2) an ester of an ethylenically unsaturated carboxylic acid and a lower alkanol and (II) converting at least 10% of the ester group of the resulting copolymer to corresponding N-substituted carbamyl groups containing polar groups in the N-substituent of the amide, as by reacting the ester (carboxylate) groups with an amine containing an —NH— group, i. e., a primary or secondary amine. A particularly effective class of such products contains an average of 4 to 1.1 ester + carbamyl groups per oil-solubilizing radical of at least 8 carbon atoms. Suitable polar-substituted carbamides and thiocarbamides are obtained when either only a portion or essentially all of the ester (carboxylate) groups are amidized with the polar-substituted amine, it being understood that the polar-substituent is a substituent on the organic portion of the amine, i. e., is attached to a carbon atom thereof.

Suitable products can also be obtained by the amidation of a polymer of a suitable vinyl monomer which contains both a suitable oil-solubilizing radical which is resistant to removal from the polymer by hydrolysis and also a suitable group adaptable to the amidation. Thus, the polymerizable $CH_2=C=$ group can have attached thereto a suitable hydrocarbyl radical of at least 8 carbon atoms and also a carboalkoxy (alkoxycarbonyl) radical, such as a carbomethoxy radical, as in methyl alpha-octadecylacrylate, ethyl alpha-hexadecylacrylate, methyl alpha-laurylacrylate, and the like. The carboalkoxy radicals are then readily converted, in part or entirely, to corresponding substituted carbamyl (i. e., N-substituted amidocarbonyl) groups, as by reaction with suitable substituted amines, as already defined, such as N,N-dimethylpropylene diamine-1,3. In this case, the ratio of the total number of the remaining carboalkoxy (ester) groups and the substituted carbamide groups to the number of oil-solubilizing groups in the product is inherently 1 to 1, and one-half of the n-alkane C-atoms are bonded individually to one carboalkoxy or carbamyl group and to one oil-solubilizing group, the other one-half of the n-alkane C-atoms being essentially unsubstituted. The ratio of the indicated polar and non-polar groups can be readily modified either way by copolymerizing the indicated type of monomer with one or both of the simpler types of polymerizable monomers, such as a normal alpha-olefinic hydrocarbon (e. g. normal alpha-octadecene) and such as an unsubstituted acrylate ester (e. g. methyl acrylate) or corresponding acrylamide. In this case, there are also required radicals, polar and/or non-polar, separately bonded to different individual C-atoms of the n-alkane chain.

It will be understood, of course, that polyamines which contain two primary and/or secondary amine groups can effect some cross-linking of the primary polymer and even a single primary amine group can effect cross-linking by the formation of a diamide. Nevertheless, the product is still essentially a poly-substituted n-alkane.

Additional polar functional groups can be incorporated in the product as by effecting the polymerization of the required monomers while admixed with other polymerizable vinyl compounds, such as vinyl acetate, which may be hydrolyzed in the resulting copolymer to yield alcohol (—OH) groups attached to n-alkane C-atoms.

Instead of providing the substituted carbamyl groups by subsequent amidation of carboxylate groups in the polymer, they can be provided in the monomer prior to polymerization. Thus, suitable products can be produced by the copolymerization of, for example, n-octadecene-1 and N-(beta-dimethylaminoethyl) acrylamide. Both carboalkoxy and substituted carbamyl groups are incorporated in the copolymer by the use of a mixture of the lower alkyl acrylate and the N-substituted acrylamide with the alkene containing the CH$_2$=CH— group.

In general, the normal alkane portion of the molecule contains at least 20 carbon atoms, and preferably at least about 30 up to about 200 with even larger chains as up to 400 being useful provided the molecular weight does not exceed about 150,000. The overall molecular weight, that is the molecular weights of the predominant proportion of the molecules should be at least 2,000, although in general it should be from 5,000 to 150,000 and preferably is from about 10,000 to about 40,000. The plurality of oil-solubilizing radicals comprising hydrocarbyl radicals of at least eight carbon atoms, preferably are alkyl radicals, but alkylcarboxyl and alkyloxy radicals are also suitable. They should be such radicals as are not readily hydrolyzable from the polymer. Thus, in the case of an ester linkage, the ester group should be hindered as much as possible as when an alkane C-atom is the alkyl C-atom of the ester alkyl carboxylate and the acyl portion is in the substituent radical, as contrasted with those esters where the acyl C-atom is attached directly to the alkane chain and the substituent alkyl radical is attached to the acyl C-atom through an oxygen atom. The hydrocarbyl portion thereof preferably contains from 14 to 28 carbon atoms, although radicals containing up to 40 carbon atoms are suitable, and some of them can contain even more. The polar-substituted carbamyl or thiocarbamyl radicals contain N-substituent functional radicals which contain a non-metallic negative atom from groups V and VI of the periodic table, preferably such atoms from series 2 and 3 having atomic numbers from 7 to 8 and 15 to 16, respectively, namely N, P, O and S. The ratio of the number of essentially the non-polar (oil-solubilizing) groups or radicals to the polar substituted carbamyl group can vary within fairly wide limits, such as from about 1 to 5 to about 5 to 1, the ratio preferably being from about 1 to 1 to 1 to 4, respectively.

The polysubstituted normal alkanes, which are utilized in the practice of the invention, can be defined in terms of the various radicals and atoms which are present, their relative attachments and their relative proportions, by the following generalized formula:

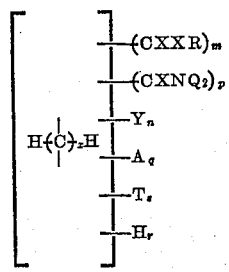

wherein: $x$ is an integral number from about 20 to about 400, and preferably from about 30 to about 200, and $m$, $n$, $p$, $q$, $r$ and $s$ are all whole numbers and their sum equals $2x$; $q$ is a whole number representing the number of oleophilic A radicals of at least eight carbon atoms each, attached separately to $q$ of the $x$ C-atoms, $p$ is a whole number of at least $x/12$, up to about $x/2$, preferably from $x/4$ to $2x/5$, being the number of carbamyl and thiocarbamyl radicals (CXNQ$_2$) attached to $p$ separate ones of the $x$ C-atoms, wherein X is a chalcogen atom of atomic number from 8 to 16 (O and S) and at least one of the two Q's is a polar group containing a nonmetallic negative atom from groups V to VI of the periodic table, preferably such atoms from series 2 and 3 having atomic numbers from 7 to 8 and 15 to 16, respectively (N, P, O and S), such other Q when different being a hydrogen or hydrocarbon radical; $m$ is a whole number of from zero to $x/5$, being the number of (CXXR) carboxylate radicals attached to $m$ separate ones of the $x$ C-atoms, wherein X is a chalcogen atom of atomic number from 8 to 16 (O and S) and R is a hydrocarbyl radical, all of the $m$ and $p$ ones of the $x$ C-atoms being different C-atoms; $n$ is a whole number from zero to $x/4$ of Y polar groups which are attached to $n$ different ones of the $x$ C-atoms and which include the polar groups as designated by A; $s$ is a whole number from zero to $m+p$, representing the number of hydrocarbon T radicals of 1 to 6 C-atoms, inclusive, attached separately to $s$ of the C-atoms; the $s$ C-atoms preferably being the same as the $m+p$ C-atoms and the sum of $m$, $p$ and $q$ is at least equal to $x/2$ while the sum of $m$ and $p$ is not greater than $3x/2$. The ratio of the number of the carbamyl groups to the number of oil-solubilizing groups can vary from 1:5 to 5:1, respectively, but preferably it is from 1:1 to 4:1.

A preferred class of the substances to be utilized in the invention, is the class of oil-soluble polyalkyl poly-alkoxycarbonyl poly-N-polar-substituted-carbamyl long chain alkanes which are representable by the formula:

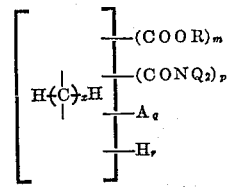

wherein: $x$ is an integral number from about 30 to about 200, and $m$, $p$, $q$ and $r$ are all whole numbers greater than one and their sum equals $2x$; $q$ is a whole number representing the number of alkyl radicals A of from 14 to 28 carbon atoms, being preferably a normal alkyl radical, attached separately to $q$ of the $x$ C-atoms, each of said $q$ C-atoms having attached thereto one of the $r$ H-atoms and also having attached to it a non-$q$ one of the $x$ C-atoms to which is attached two others of the $r$ H-atoms; $p$ is a whole number of from $x/4$ to $2x/5$, being the number of carbamyl radicals (CONQ$_2$) attached to $p$ separate ones of the $x$ C-atoms, wherein at least one of the two Q's is an amino-containing, preferably tertiary amino, hydrocarbyl radical, such other Q when different being a hydrogen or hydrocarbon radical; $m$ is a whole number from zero to $x/5$, being the number of alkoxycarbonyl (carboalkoxy) radicals (COOR), wherein R is a lower alkyl radical of from 1 to 3 carbon atoms, inclusive, attached to $m$ separate ones of the $x$ C-atoms, all of the $m$ and $p$ ones of the $x$ C-atoms being different C-atoms; and $r$ is the number of H-atoms required to saturate the bonds of the $x$ C-atoms which are not bonded to —COOR, —CONQ$_2$ and —A radicals and is equal to at least $3q+2(m+p)$ up to $3(q+m+p)$ or $3x/2$.

By designating the separate atoms of the $x$ C-atoms to which the $q$ alkyl radicals A are attached by $x_1$'s, wherein the total number of $i$'s is equal numerically to $q$, and the separate C-atoms to which the $m$ alkoxycarbonyl radicals (COOR) are attached by $x_j$'s, wherein the total number of $j$'s is equal numerically to $m$, and the separate C-atoms to which the $p$ N-aminoalkylcarbamyl radicals (CONQ$_2$) are attached by $x_k$'s, wherein the total number of $k$'s is equal numerically to $p$, a preferred class of the substances can be defined as follows: $x_i$-polyalkyl-$x_j$-polyalkoxycarbonyl - $x_k$ - poly - N - aminoalkylcarbamyl - C$_{2(i+j+k)}$-n-alkane, wherein the $x_i$'s, $x_j$'s and $x_k$'s are the separate $i$, $j$ and $k$ C-atoms of a normal alkane of twice their sum of C-atoms and they are essentially alternate C-atoms throughout the length of the alkane chain, and $i$, $j$ and $k$ each is greater than one, and twice their sum is at least 30.

The polymeric products as set forth hereinbefore in general terms have been determined to be particularly outstanding additives for fuel oils, particularly for distillate types of fuel oils, and especially those hydrocarbon distillate mixtures which contain cracked components. When these products are added to the fuel oil, even in very small amounts, they display unexpected ability to inhibit the formation of sludge and sediment during prolonged storage periods, and they prevent discoloration of the fuel oil. In addition, these products are retained in the fuel oil and are not lost or leached therefrom when the oil is brought in contact with water, as is the case with many of the commercial fuel oil additives. The polymeric products have also been found to be valuable as anti-wear agents and detergents for various lubricating oils and compositions. Also, in addition to exhibiting anti-wear properties in grease formulations, they serve to impart to the grease increased oxidation stability.

In accordance with a preferred embodiment of the invention as already indicated, the polymeric additive contains 3 essential units in certain proportions. One unit is derived from an ethylenically unsaturated monomer having a single ethylenic group which is in a terminal position and has the structure CH$_2$=CH— and has an uninterrupted chain, in addition to the vinyl group, of at least 8 carbon atoms.

The chain may be branched or unbranched and may contain cyclic structures but there should be a series of at least 10 carbon atoms joined together through a primary chemical bond. These monomers include, among others, unsaturated hydrocarbons, unsaturated esters, ethers, ketones and the like. Examples of such monomers include, among others, decene-1, dodecene-1, tridecene-1, tetradecene-1, pentadecene-1, hexadecene-1, heptadecene-1, octadecene-1, nonadecene-1, eicosene-1, heneicosene-1, docosene-1, tricosene-1, tetracosene-1, pentacosene-1, hexacosene-1, heptacosene-1, octacosene-1, nonacosene-1, triacontene-1, hetriacontene-1, dotriacontene-1, tritriacontene-1, tetratriacontene-1, pentatriacontene-1, hexatriacontene-1, heptatriacontene-1, octatriacontene-1, nonatriacontene-1, tetracontene-1, pentacontene-1, hexacontene-1, and heptacontene-1, vinyl hendecanoate, vinyl laurate, vinyl tridecanoate, vinyl myristate, vinyl pentadecanoate, vinyl palmitate, vinyl margarate, vinyl stearate, vinyl nonadecanoate, vinyl arachidate, vinyl behemate, vinyl 4,5,6-trimethyldodecanoate, vinyl 6,8,9-triethyl tridecanoate, allyl stearate, vinyl hydroxystearate, vinyl chlorostearate, vinyl cyanostearate, vinyl acetylstearate, vinyl dodecyl ether, vinyl tridecyl ether, vinyl tetracosyl ether, vinyl hexacosyl ether, allyl dodecyl ether, vinyl dodecyl ketone, vinyl tridecyl ketone, vinyl nonadecyl ether, vinyl octadecyl ether, vinyl octadecyl ketone, vinyl chlorododecyl ether, and the like.

Partcularly preferred ethylenically unsaturated monomers to be used in preparing the copolymers are those having an uninterrupted chain of from 10 to 30 carbon atoms, and more preferably an alpha-olefin (normal or branched) containing from 16 to 30 carbon atoms, such as, for example, n-hexadecene-1, n-octadecene-1, n-tricosene-1, n-octacosene-1, and the like. These preferred olefinic materials can be obtained for example, by cracking paraffin waxes, as is well known in the art.

The second unit contained in the novel copolymer is derived from an ester of an ethylenically unsaturated carboxylic acid and a lower alkanol. The acids used in preparing these esters may be monocarboxylic acid or polycarboxylic acid and may have the ethylenic group in a terminal or internal position. The alcohols used in the esterification of these acids comprise the lower alkanols, and preferably those containing no more than 4 carbon atoms, such as methanol, ethanol, n-propanol and isopropanol. If the acids are polycarboxylic acids, only one of the carboxyl groups may be esterified with the lower alkanols and the others may be esterified with other types of alcohols, or, if desired all of the carboxyl groups may be esterified with the lower alkanols. Examples of these esters include, among others, methyl acrylate, ethyl acrylate, methyl chloroacrylate, methyl alpha-isopropylacrylate, ethyl alpha-amylacrylate, isopropyl alpha-cyclohexylacrylate, propyl alpha-hexylacrylate, ethyl methacrylate, propyl methacrylate, methyl alpha-acetylacrylate, methyl alpha-cyclohexylacrylate, dimethyl maleate, diethyl maleate, dipropyl maleate, dimethyl chloromaleate, dimethyl hexylmaleate, methyl octyl maleate, methyl octadecyl maleate, ethyl cyclohexyl chloromaleate, dimethyl itaconate, diethyl glutaconate, methyl octyl aconitate, dimethyl glutaconate, methyl hexyl glutaconate, dimethyl 2-pentenedioate, diethyl 3-octenedioate-1,7, methyl cyclohexyl glutaconate, ethyl phenyl aconitate, and the like.

Particularly preferred esters to be employed are the esters of the ethylenically unsaturated aliphatic mono- and dicarboxylic acids containing no more than 12 carbon atoms, and alkanols containing no more than 3 carbon atoms, and more preferably the alkyl esters of the alkenoic acids containing no more than 10 carbon atoms. Coming under special consideration are the lower alkyl esters of acrylic and the alpha-alkyl substituted acrylic acids, such as methyl acrylate, propyl acrylate, propyl methacrylate, methyl alpha-butylacrylate, and the like.

The third unit contained in the novel copolymer is derived from N-substituted amides of unsaturated carboxylic acids wherein the substituent on the nitrogen atom contains a polar group. The unsaturated carboxylic acids used in preparing such amides are the same as those described above for the unsaturated ester, i. e. they may be monocarboxylic or polycarboxylic acid and may have the ethylenic group in a terminal or internal position. If the acid is a polycarboxylic acid, it may be a polyamide or it may have the other carboxyl group or groups esterified with any of the above-described lower alcohols or higher alcohols, such as, for example, octyl alcohol, decyl alcohol, dodecyl alcohol, octadecyl alcohol, and the like. The polar groups attached to the nitrogen atom of the amide group are functional radicals which contain a nonmetallic negative atom from groups V to VI of the periodic table, such as N, P, O and S. Such polar groups include, among others, —XR, —CXXH, —CN, —SCN, —NH$_2$ and —CONH$_2$, wherein X is O or S and R is a hydrogen or hydrocarbon radical. N-butanol methacrylamide, N-hexanol methacrylamide, N-(3-aminopropyl) methacrylamide, N-(5-carboxyhexyl)acrylamide, N-morpholinoethyl acrylamide, N-dimethylaminoethyl acrylamide, N-(6-mercaptooctyl)acrylamide, N-(6,6,-dihydroxyethylocetyl)acrylamide, N - (6 - cyanohexyl)acrylamide, N-(6-hydroxyoctyl)alphaoctylacrylamide, N,N-di-(6-hydroxyoctyl)maleamide, N, N-di(dimethylaminoethyl)-itaconamide, N,N-di(mercaptobutyl)aconitamide, N-(6 - thiocyanooctyl)acrylamide, and N - (4 - hydroxyhexyl)butyl aconitamide.

Preferred unsaturated amides of this type comprise the N-substituted amides of the ethylenically unsaturated aliphatic mono- and dicarboxylic acids containing no more than 12 carbon atoms wherein the substituent attached to the nitrogen atom is substituted with a

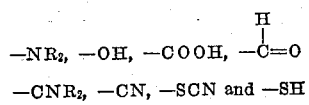

group (wherein R is a hydrogen and/or hydrocarbon radical). Especially preferred are the aforedescribed unsaturated amides wherein the nitrogen atom is attached to an aliphatic or aromatic hydrocarbon radical which is in turn substituted with at least one member of the group of

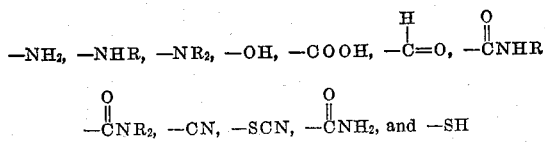

groups (wherein R is an aliphatic or aromatic hydrocarbon radical), said unsaturated amide preferably containing no more than a total of 25 carbon atoms.

Coming under special consideration are the N-(hydroxyhydrocarbyl)amides, N-(aminohydrocarbyl)amides, N-(mercaptohydrocarbyl)amides, N - (formylhydrocarbyl)-amides, N-(thiocyanohydrocarbyl)amides, and N-(cyanohydrocarbyl)amides of ethylenically unsaturated monocarboxylic acids, and preferably those in which the carbamyl C-atom is attached directly to one of the ethylenic C-atoms, and of particular utility are those in which the N-substituent contains a total of from 2 to 12 C-atoms and the indicated hydrocarbyl portion contains from 2 to 6 C-atoms.

The foregoing copolymers may be prepared by any suitable method. They are preferably prepared, however, by first copolymerizing the ethylenically unsaturated monomer having an uninterrupted chain of at least 10 carbon atoms with the unsaturated ester in the necessary proportions so as to have the units of the unsaturated monomer having the uninterrupted chain of at least 10 carbon atoms and the ester groups in the required ratio, and then treating this copolymer with a polypolar compound having a

group and an additional polar group so as to convert at least 10% of the ester groups to amide groups.

In this method, it is essential first to prepare the copolymer of the unsaturated monomer having an uninterrupted chain of at least 10 carbon atoms and the unsaturated esters so as to obtain the necessary ratio between the unit of the unsaturated monomer and the ester groups. Products having such a ratio of units are obtained by controlling the ratio of concentrations of monomers used in the polymerization reaction. The above two groups of monomers fail to have the same polymerization rate so that the proportions in which they enter the copolymer molecule will differ from the proportions in which they occur in the reaction mixture. It will be necessary, therefore, to determine beforehand the ratio of concentrations of monomers needed to give copolymers having the two monomers in the above-described ratio. This can be easily determined by conducting a few routine runs and examining the composition of the resulting copolymer. The initial concentration of monomer can then be adjusted so as to give the copolymer of the desired composition.

As the reaction progresses, the monomer concentration ratios change due to the difference in the rate of polymerization and, in some cases, the ratio will change so that it will not be producing copolymers having the monomers in the desired ratio. While this is not too damaging if a very small part of the copolymer has the monomers outside of the desired ratio, but if there is a considerable amount of copolymer formed outside of the ratio, the products will fail to have the desired superior properties. The best products are, therefore, obtained by employing some steps during the copolymerization which will insure that the ratio of concentrations of monomers does not vary during the reaction period from the above-described limits. This may be accomplished in a variety of ways. One way, for example, comprises stopping the copolymerization after the ratio of the monomer concentrations has reached the limiting value. This method is of particular value if the change in the ratio between the monomer concentrations during the copolymerization is slow and a considerable yield of copolymer has been obtained before the limiting values have been attained.

Another method is to adjust the ratio between the monomer concentrations by adding monomer during the course of the polymerization. In a copolymerization of the above-described two groups of monomers, it is sometimes sufficient if the monomer which is consumed at the fastest rate is added to the reaction mixture. This addition can occur periodically or continuously.

To obtain copolymers wherein the greatest part of their macromolecules have the same composition and thus display their superior properties to the highest extent, it is preferred to keep the concentrations of the monomers constant as well as the ratio of concentrations constant. This is preferably obtained by adding all of the monomers at the rate at which they are consumed. This greatest uniformity of conditions is generally obtained in a continuous process whereby copolymerization takes place in a space from which the copolymer is drained off at the rate at which it is formed and in which the feed of monomers and other substances employed in the copolymerization exactly compensate for the consumption and drainage taking place when the copolymer is removed.

Copolymers used in preparing the superior amidized products have molecular weights below about 150,000 and preferably between 10,000 and 40,000. The molecular weights reported herein are determined by light scattering technique described in Chem. Rev., volume 40, page 319 (1948).

Any suitable conditions may be employed to maintain the molecular weight within the desired range. Factors which exert an influence on the molecular weight of the copolymer include the method of polymerization (e. g. polymerization in emulsion, suspension solvent solution or bulk), the nature and concentration of the catalyst employed, the temperature, presence of chain transfer agents, etc. When the polymerization is accomplished in solution, the molecular weight of the product will be lower when the dilution is stronger, i. e., when the concentration of solvent is greater. In general, the higher the polymerization temperature the lower will be the molecular weight of the finished copolymer.

Materials that may be used as chain transfer agents in the preparation of the copolymers include alcohols, aldehydes, such as valeraldehyde, ketones, such as acetone, methyl ethyl ketone, ethers, such as diethyl ether, halogenated hydrocarbons, as carbon tetrachloride, halogenated alcohols, aldehydes, ethers, organic acids, such as alpha-bromopropionic acid and esters or anhydrides of such acids, such as propyl trichloroacetate, acid halides, such as acetyl chloride, esters of inorganic acids, such as tetraethyl silicate, tributyl phosphate, various nitrogen compounds, such as amines, cyanogen and nitro compounds, sulfur halides, benzene sulphonyl chloride, mercaptans, such as dodecyl mercaptan, and the related organic sulfur compounds. The amount of such agent employed will vary over a wide range but in most cases will be between 1% to 30% by weight of the material being polymerized.

The copolymers may be prepared in bulk, solvent solution, or in an aqueous emulsion or suspension system.

Best results are obtained by heating the monomers in bulk or solvent solution and these are the preferred methods to be employed.

Catalysts used in the preparation of the copolymers are preferably the peroxide catalyst, such as, for example, benzoyl peroxide, lauroyl peroxide, tertiary butyl hydroperoxide, 2,2-bis-(tertiary butyl peroxy)butane, di(tertiary butyl)peroxide, tertiary butyl perlargonate, hydrogen peroxide, sodium or potassium persulfate, percarbonate, peracetic acid, and the like. The amount of the catalyst added may vary over a considerable range. In general, the amount of the catalyst added will vary from 0.1% to 5% by weight of the material being polymerized. Preferred amounts vary from 1% to 2% by weight.

The catalyst selected and the temperature employed in the copolymerization will be varied so as to produce products having the desired molecular weights. Thus, if one desires very low molecular weight products, one should select a higher reaction temperature, such as of the order of 150° C. to 300° C., and select a catalyst that has a satisfactory decomposition rate within that range of temperature. If the higher molecular weight products are desired, one may select the lower range of temperature, such as 50° to 100° C., and select a catalyst having a decomposition rate within that range. In general, it is preferred to employ temperatures within the range of 80° C. to 200° C. and catalysts that will be effective within that range.

The polymerization may be conducted in the presence or absence of air. In most cases, however, it has been found desirable to conduct the polymerization in the absence of air, e. g., in the presence of an inert gas such as nitrogen. Atmospheric, reduced or superatmospheric pressures may be employed.

At the end of the polymerization, the unreacted monomer is removed by any suitable means, such as distillation, and the like. It is also desirable to remove, preferably by distillation, polymeric fractions of very low molecular weight, such as that boiling below 190° C. at 1 mm.

Amide-containing copolymers of the present invention are obtained by reacting the above-described copolymers with a polypolar compound containing a $$-\underset{|}{\overset{H}{N}}-$$

group and at least one additional polar group. The polar groups are those described above in the description of the unsaturated amides, i. e. radicals which contain a non-metallic negative atom from groups V and VI of the periodic table, such as N, P, O and S. Such polar groups include, among others, —XR, —CXXH, —CN, —SCN, —NR₂ and —CONR₂, wherein X is O and S and R is a hydrogen or a hydrocarbon radical. Examples of these polypolar compounds include, among others, diethylene triamine, triethylene tetramine, N,N-dimethylaminopropyleneamine, N,N-dibutyl-1,3-propane diamine, N,N-diethyl-1,3-propane diamine, 1,2-diamino-2-methylpropane, 2,3-diamino-2-methylbutane, 2,4-diamino-2-methylpentane, 2,7-diamino-2,6-dimethyloctane, diaminopyridine, meta-phenylene diamine, beta-propylaminoethanol, beta-isopropylaminoethanol, beta-cyclohexylaminoethanol, aminocyclohexanol, gamma-ethylaminopropanol, deltaisobutylaminobutanol, beta-laurylaminoethanol, N-ethyl 3-aminopentanamide, N-(aminoethyl)morpholine, 3,5-diaminobenzamide, N-isopropyl 4-aminododecanamide, N-butyl 4-aminohexadecanamide, 3-aminopentanoic acid, 4-aminohexanoic acid, 4,6-diaminodecanoic acid, 4-aminocyclohexanoic acid, aminosuccinonitrile, aminoisophthalnitrile, aminomyristonitrile, aminooleonitrile, aminobenzonitrile, 3-aminothiobenzoic acid, 4-aminocyclohexanecarboxylic acid, 3-amino-5-thiocyanooctane, 4-amino-6-thiocyanododecane, 3-aminothionoheptanoic acid, 4-aminothionooctanoic acid, 4-aminopentanamide, 5-aminoheptanamide, and the like.

Particularly preferred polypolar compounds to be used in preparing the amide-containing polymeric products of the present invention include the primary amines substituted with a

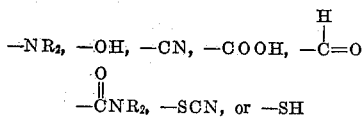

group (wherein R is hydrogen and/or a hydrocarbon radical), such as triethylene diamine, N,N-dimethylaminopropyleneamine, N,N-dibutyl-1,3-propane diamine, N,N-diethyl-1,3-propane diamine, 1,2-diamino-2-methylpropane, 2,4-diamino-2-methylpentane, diaminopyridine, beta-cyclohexylaminoethanol, aminocyclohexanol, N-isopropylhexadecanamide, 4-amino-6-thiocyanododecane, and the like.

Especially preferred are the aliphatic and aromatic hydrocarbons substituted with a primary —NH₂ group and at least one member of the group consisting of a

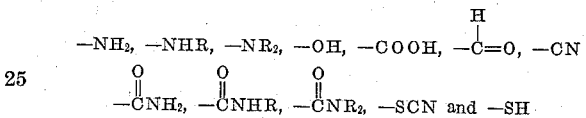

group (wherein R is an aliphatic or aromatic hydrocarbon radical) and containing no more than 20 carbon atoms. Coming under special consideration are the alkyl, cycloalkyl, alkenyl, cycloalkenyl, aryl, alkaryl and arylalkyl amines substituted with a member of the group of

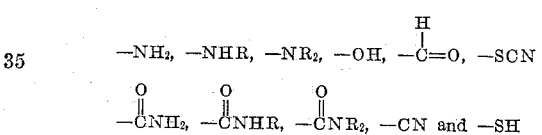

groups (wherein R is an alkyl, cycloalkyl, aryl, alkaryl, or arylalkyl radical containing no more than 10 carbon atoms), and containing in the total molecule no more than 16 carbon atoms.

The amount of the polypolar compound to be reacted with the copolymer should be sufficient to convert at least 10% up to 100% of the ester groups to amide groups, i. e. convert at least 10% of the

radicals attached to the copolymer chain (wherein R is a lower alkyl radical) to

groups. Preferably from 30% to 90% of the ester groups are converted to amide groups. The amount required for this purpose can be easily calculated from the analytical data of the copolymers such as their ester values. In most cases, it is preferred to employ from 10% to 30% excess of that theoretically required to convert the desired number of ester groups.

The reaction between the copolymer and the amine may be accomplished by merely mixing the two components together alone or in a mutual solvent and, if necessary, applying heat. Preferred temperatures range from about 50° C. to 250° C. and preferably from 100° C. to 165° C. If the amine has a plurality of polar groups which may cross-link the copolymers, such as a plurality of amino groups, it will be necessary to employ an excess of the amine or milder reaction conditions as lower temperatures, such as temperatures below about 200° C. and shorter reaction periods, in order to prevent such cross-linking.

The alcohol formed during the reaction between the copolymer and the polypolar compound may be removed from the reaction mixture as desired. In most cases, it is preferred to remove the alcohol substantially as fast as it is formed in the reaction.

At the end of the reaction, the unreacted polypolar compound, solvent and remaining alcohol may be removed by any suitable method, such as by distillation, extraction, fractional precipitation, and the like.

These amide-containing copolymers have been found to have a high degree of oil solubility and can be combined in a variety of proportions with various oils, solvents and resins. As indicated above, they are particularly superior as additives for fuel oils as they are readily compatible therewith and when added even in small amounts act to inhibit formation of sludge and sediment during prolonged storage of the oils. In addition, these polymeric products act to prevent discoloration of the oils during the storage period. Furthermore, the polymeric products are not easily leached or removed from the oils when exposed to water so that they are able to exert their anti-clogging and color stabilization properties over a longer period than many of the additives now used commercially. The fuel oils in which the copolymers are particularly effective are the hydrocarbon distillate fuel oils such as treated or untreated cracked fuel oils, or mixtures of cracked fuels (thermally cracked and/or catalytically cracked) with straight run fuel oils, having components normally distilling at about 500° F. and having an end distillation point not exceeding 750° F. Generally such fuels have a boiling range of from 340° F. to about 700° F. and preferably have a boiling range of from about 400° F. to about 675° F. The copolymers are employed with these oils in amounts varying from 0.01% to about 2%, and more preferably in amounts varying from 0.1% to 1% by weight.

To illustrate the manner in which the additives may be prepared, the following examples are given. It is to be understood, however, that the examples are for the purpose of illustration and the invention is not to be regarded as limited to any of the specific materials recited therein. Unless otherwise specified, parts disclosed in the examples are parts by weight.

*Example I*

This example illustrates the preparation of an amide-containing copolymer from (1) a copolymer of octadecene-1 and methyl acrylate and (2) N,N-dimethylaminopropyleneamine, and the unexpected properties of this product as a fuel oil additive.

504 parts (2 mols) of octadecene-1 and 43 parts (.5 mol) of methyl acrylate were mixed with 2.7 parts of 2,2-bis (tert-butylperoxy)-butane in a stainless steel bomb and heated for 16 hours at 110° C. The unreacted monomer was then removed by distillation under vacuum. There was a 23.6% conversion to polymer. The resulting product was a water-white liquid polymer containing 1.3 units of methyl acrylate per unit of octadecene-1.

100 parts of the above-copolymer was mixed with 60 parts of N,N-dimethylaminopropyleneamine and the mixture heated at 100° C. for 4 hours. The alcohol formed in the reaction was removed by distillation under reduced pressure. The resulting product was a light brown polymer having mol weight of 24,000. Analysis indicated that 32.8% of the ester groups had been converted to amide groups, giving a product with a ratio of methoxycarbonyl to dimethylaminopropylcarbamyl of about 2 to 1 and a ratio of total of ester and amide groups to hexadecyl radicals of 1.3 to 1.

The outstanding property of the above amide-containing copolymer as a fuel oil additive is shown by the following. 0.01% by weight of the amidized copolymer was added to an unstabilized No. 3 fuel oil. The resulting composition had good color stability and on storage failed to deposit any sludge or sediment. The composition also had excellent resistance to leaching when exposed to steam. Some of these properties are shown in the following table in comparison to those obtained from a fuel oil containing no additive and one containing a commercial additive.

| Additive | Color Stability, NPA Color After 48 Hrs. at 212° F. | Screen Clogging Test, P mm. H$_2$O[c] | Leaching Resistance, Steamings to Fail[d] | Asphaltene Test, mg./l[e] |
|---|---|---|---|---|
| None | 8+ (sediment) | 382 | 1 | 250 |
| Commercial Additive[a] | 7+ | 141 | 7 | 213 |
| Commercial Additive[b] | 5+ | 7 | 3 | 227 |
| Amidized Copolymer Prepared Above | 2 | 3 | 16 | 125 |

[a] Mixture sodium sulfonate and calcium salt of phenol-formaldehyde condensate.
[b] 0.02 percent w. Du Pont No. 2 fuel oil additive.
[c] Approximately one gallon of the test fuel is filtered through a 200 mesh screen and thereafter steamed and circulated through a 100 mesh Monel screen ⅝" in diameter at the rate of 36 ml./min. for a period of 16 hours at room temperature. The extent of screen clogging is measured by the pressure drop across the screen. A constant flow rate is maintained by metering pumps and the pressure drop (P) across the screen is measured by means of an open end monometer.
[d] 14 parts steam per 3500 ml. of test fuel circulate through screen clogging machine for 5 hours. Let remain overnight in storage. Process repeated. After each run pressure drop measure. Failure is when pressure goes up.
[e] 0.5 percent w. water added to fuel; mixture heated at 212° F., 1 atm. for 16 hours. Asphaltenes determined as pentane insoluble, acetone soluble.

The anti-wear and lacquer-formation inhibiting characteristics of this amide of this Example I was demonstrated at 0.5% w. concentration in an SAE 30 refined mineral lube oil stock, by the FL-2 Engine Test described in the CRC Handbook. The wear was only 60% of the wear with the same oil, but without the additive, while the lacquer rating was 9 out of a clean 10 as compared with a rating of only four for the oil without the additive.

*Example II*

The preparation of Example I was repeated except that the catalyst was benzoyl peroxide and the polymerization was effected at a temperature of 80° C. (16 hours). The resulting product was a water-white liquid polymer containing 1.63 units from methyl acrylate per unit from octadecene-1.

100 parts of the above copolymer was mixed with 200 parts of N,N-dimethylaminopropyleneamine and the mixture heated at 110° C. for 32 hours. The alcohol formed in the reaction was removed by distillation under reduced pressure. The resulting product was a light brown solid. Analysis indicated that 65.6% of the ester groups had been converted to amide groups.

The amidized copolymer produced above was added in amount of 0.01% to No. 3 fuel oil. The resulting composition had good color stability and resistance to deposition of sludge and sediment. The composition also had excellent resistance to leaching when exposed to steam.

The above amide-containing copolymer also proved to be a promising detergent and anti-wearing agent for lubricating oils.

*Example III*

This example illustrates the preparation of an amidized product from (1) a copolymer of octadecene-1 and methyl acrylate and (2) N,N-diethylaminopropyleneamine and the use of this product as a fuel oil additive.

100 parts of a copolymer of octadecene-1 and methyl acrylate as produced in Example I was mixed with 130 parts of N,N-diethylaminopropyleneamine and the mixture maintained at 160–165° C. for 24 hours. The resulting product was a light brown solid. Analysis indicated that 81.5% of the ester groups had been converted to amide groups.

The amide containing copolymer produced above was added in amount of 0.01% to No. 3 fuel oil. The resulting composition had good color stability and resistance to deposition of sludge and sediment. The composition

Example IV

This example illustrates the preparation of an amidized product from (1) a copolymer of octadecene-1 and methyl acrylate and (2) monoethanolamine, and the use of this product as a fuel oil additive.

100 parts of a copolymer of octadecene-1 and methyl acrylate as produced in Example I was mixed with 61 parts of monoethanolamine and the mixture maintained at 165° C. for 24 hours. The resulting product was a light brown solid. Analysis indicated that 51% of the ester groups had been converted to amide groups.

The amide-containing copolymer produced above was added in amount of 0.01% to No. 3 fuel oil. The resulting composition had good color stability and resistance to deposition of sludge and sediment. The composition also had good resistance to leaching when exposed to steam.

Example V

This example illustrates the preparation of an amidized product from (1) a copolymer of vinyl stearate and methyl acrylate and (2) N,N-dibutyl propane-1,3-diamine, and the use of this product as a fuel oil additive.

310 parts of vinyl stearate and 43 parts of methyl acrylate are mixed with 2.5 parts of 2,2-bis(tert-butyl-peroxy)butane in a stainless steel bomb and heated for 16 hours at 110° C. The unreacted monomer was then removed by distillation under vacuum. The resulting product has approximately 2 units from methyl acrylate per unit from vinyl stearate.

100 parts of the above copolymer is mixed with 60 parts of N,N-dibutyl propane-1,3-diamine and the mixture heated at 100° C. for 4 hours. The alcohol formed in the reaction is removed by distillation under reduced pressure. The resulting product is a light brown solid. Analysis indicated that approximately 40% of the ester groups had been converted to amide groups.

The amidized copolymer produced above is added in amount of 0.01% to No. 3 fuel oil. The resulting composition has good color stability and resistance to deposition of sludge and sediment. The composition also has good resistance to leaching.

An amide-containing copolymer having related properties is obtained by replacing the N,N-dibutyl propane-1,3-diamine in the above process with aminoethyl morpholine.

Example VI

This example illustrates the preparation of an amidized product from (1) a copolymer of hexadecene-1 and methyl methacrylate and (2) 4-aminobutylmercaptan and the use of this product as a fuel oil additive.

448 parts of n-hexadecene-1 and 43 parts of methyl methacrylate are mixed with 2.5 parts of 2,2-bis(tert-butyl-peroxy)butane in a stainless steel bomb and heated for 16 hours at 110° C. The unreacted monomer was then removed by distillation under vacuum. The resulting product has approximately 2 units of methyl methacrylate per unit of hexadecene-1.

100 parts of the copolymer prepared above is mixed with 100 parts of 4-aminobutylmercaptan and the mixture heated at 100° C. for 4 hours. The alcohol formed in the reaction is removed by distillation under reduced pressure. The resulting product is a light brown solid.

The amidized copolymer produced above when added to No. 3 fuel oils acts as an anti-clogging and stabilizing agent in the same manner as the amidized copolymers shown in the other examples.

Amidized copolymers having related properties are obtained by replacing the 4-aminobutylmercaptan in the above process with equivalent amounts of 1-cyano-5-aminopentane and 1-thiocyano-5-aminopentane.

Example VII

This example illustrates the preparation of an amidized polymeric product from (1) a copolymer of octadecene-1 and methyl acrylate and (2) 4-aminobutyraldehyde.

100 parts of a copolymer of octadecene-1 and methyl acrylate as produced in Example I is mixed with 100 parts of 4-aminobutyraldehyde and the mixture maintained at 160–165° C. for 24 hours. The resulting product is a light colored solid. Analysis indicated that over 25% of the ester groups had been converted to amide groups.

The above-amide-containing copolymer is a good stabilizing agent for fuel oil when added in amounts varying from 0.01% to .1%.

Example VIII

This example illustrates the preparation of an amidized polymeric product from (1) a copolymer of hexadecene-1 and methyl methacrylate and (2) 4-aminopentanamide.

100 parts of the copolymer of hexadecene-1 and methyl methacrylate produced in Example VI is mixed with 150 parts of 4-aminopentanamide and the mixture maintained at 150–165° C. for 20 hours. Analysis of the resulting polymer indicated that about 30% of the ester groups had been converted to amide groups.

The above-described amide-containing copolymer is a good stabilizing agent for fuel oil when added in amounts varying from 0.01% to .1%.

Example IX

An amidized copolymer having related properties as a fuel oil additive is obtained by reacting the octadecene-1-methyl acrylate copolymer of Example I with 4-aminopentanoic acid.

Further examples are given to illustrate other methods which are suitable for the preparation of polycarbamylalkanes to be utilized in accordance with this invention.

Example X

About 4 mols of a methyl alpha-octadecylacrylate polymer was mixed with 2 mols of N-hydroxyethylethylene diamine and the mixture heated for about 24 hours at 100° C. in the presence of benzoyl peroxide catalyst. About 30% of the ester groups were converted to amide groups, and a resinous polymeric polyamide polycarboxymethylalkane was recovered from the reaction mixture.

Example XI

About 4 mols of a 50/50 methyl alpha-octadecyl acrylate/vinyl acetate copolymer was mixed with 4 mols of N-aminoethyl morpholine and the mixture was reacted under the conditions described in Example VII. About 60% of the ester groups were converted to amide groups, and a resinous polyamide polycarboxymethyl polyhydroxy alkane was recovered from the reaction mixture.

Example XII

About 4 mols of a 50/50 methyl acrylate/vinyl octadecyl ketone copolymer was mixed with about 4 mols of di(aminoethyl) ether and the mixture reacted under conditions described above. About 40% of the ester groups were converted to amide groups to yield a resinous polyamide polycarboxymethyl polyoctadecyl alkane.

As already shown the polymeric products of this invention are outstanding additives for various organic products particularly predominately hydrocarbons, such as natural and synthetic hydrocarbon lubricating oils, greases, fuels (gasoline, gas oil, burner fuel oil), asphalts, waxes, slushing oils, industrial oils, metal working and drawing oils, quenching oils, textile oils, dielectric compositions and other industrial oils. They are particularly outstanding when added in small amounts to lubricating oils, and lubricating compositions in order to impart detergency and anti-wear properties to such materials. Also these additives are particularly outstanding additives for fuel oils. When these particular products are added to the fuel oil, even in very small amounts, they display unexpected ability to inhibit the formation of sludge and sediment during prolonged storage periods, and prevent discoloration of the fuel oil. In addition, these polymeric products are retained in the fuel oil and are not lost or leached therefrom when the oil is brought in contact with water, as is the case with many of the commercial fuel oil additives.

Lubricating bases for additives of this invention can be any natural or synthetic hydrocarbonaceous material having lubricating properties. Thus, the base may be a hydrocarbon oil of wide viscosity range, e. g., 100 SUS at 100° F. to 150 SUS at 210° F. The hydrocarbon oils may be blended with fixed oils such as castor oil, lard oil and the like, and/or with synthetic lubricants such as polymerized olefins, copolymers of alkylene glycols and oxides; organic esters of polybasic organic and inorganic acids, e. g., di-2-ethylhexyl sebacate, dioctyl phthalate, trioctyl phosphate; polymeric tetrahydrofuran; polyalkyl silicone polymers, e. g., dimethyl silicone polymer and the like.

Representing mineral lubricating oils which have been utilized in evaluating the utility of the present additives had the following specifications:

| | I | II |
|---|---|---|
| Gravity, °API | Min. 26.5 | Min. 24.5. |
| Pour Point, ° F | Max. 10 | Max. −5. |
| Flash, COC, ° F | Min. 490 | Min. 415. |
| Viscosity, SUS at 210 ° F | 120–125 | 60–63. |
| Viscosity Index | Min. 95 | 50–60. |

Fuel oils which are greatly improved by the addition thereto of a minor amount of additives of this invention are of the type described in U. S. Patents 2,639,227 and 2,672,408. The additives of this invention prevent discoloration and inhibit clogging tendencies both phenomena being common occurences in such fuel oils which contains cracked and straight run fractions. An added feature of additives of this invention is that they resist leaching and inhibit formation of emulsions when fuel oils or lubricating oils come in contact with water. Conventional color stabilizers and anti-clogging agents generally do not possess these properties.

The polymeric compounds of this invention are generally added in minor amounts of from 0.001% to 10% and preferably from 0.01% to 1% by weight depending upon the base composition to which they are added and the purpose for which they are added. In lubricants the additives can be used in amounts of from 0.02 to 1% while in fuel compositions considerable less amount can be used generally between 0.005% and 0.02% by weight.

Compositions of this invention can be modified by addition thereto of minor amounts (0.01–2%) of pour point depressants, viscosity index improvers, blooming agents, corrosion inhibitors, oiliness agents, solubilizers, and the like. Among such materials can be included high molecular weight polymers, e. g., "Acryloids," which are polymeric esters of methacrylic acid and coconut fatty acids, wax naphthalene condensation products, isobutylene polymers, alkyl styrene polymers; inorganic and organic nitrites such as $NaNO_2$ or $LiNO_2$ and diisopropylammonium nitrite or dicyclohexylammonium nitrite: organic phosphites, phosphates and phosphonates such as trichloroethyl phosphite, tricresyl phosphate, dilorol phosphate, phosphorus sulfide-olefinic reaction products such as $P_2S_5$-terpene reaction products, metal organic phosphates, e. g., Ca or Zn dicyclohexylthiophosphate or methylcyclohexyl-thiophosphate: organic sulfides, e. g., wax disulfide, ethylene bistolyl sulfide: amine, e. g., octadecylamine and the like. Also, phenolic antioxidants such as 2,6-ditertiary-4-methyl phenol and 2,2'-methylene bis(4-methyl-6-tertiarybutylphenol) as well as conventional detergents of the sulfonate and phenate class exemplified by alkali and alkaline earth organic sulfonates and phenates e. g., Na, Ca or Ba petroleum sulfonate and Na, Ca, Ba, or Zn cetyl phenate and Ca, Ba or Zn salt of octyl phenolformaldehyde condensation product, etc., can be used in conjunction with the amidized polymers of this invention.

We claim as our invention:

1. A hydrocarbon oil composition containing a minor amount, sufficient to stabilize said oil against oxidation and sludging, of an oil-soluble polymeric reaction product formed by reacting a 1-olefin having at least 10 carbon atoms with an ester of an acrylic acid and a lower alkanol of from 1 to 3 carbon atoms in the mole ratio of from 1:5 to 5:1, respectively, in the presence of a peroxide type catalyst, and thereafter amidizing at least 10% of the said ester groups in the polymer with an amine containing a substituent polar group selected from

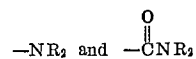

wherein R is a hydrocarbyl radical.

2. A hydrocarbon oil composition containing a minor amount, sufficient to stabilize said oil against oxidation and sludging, of an oil-soluble polymeric reaction product formed by reacting 1-olefin having from 18 to 30 carbon atoms with a $C_1$–$C_3$ alkyl acrylate in the mole ratio of 1:5 to 5:1, respectively, and in the presence of a peroxide type catalyst, and thereafter amidizing from 30% to 90% of the ester groups in the polymer with an aliphatic diamine.

3. A hydrocarbon oil composition containing a minor amount, sufficient to stabilize said oil against oxidation and sludging, of an oil-soluble polymeric reaction product having a molecular weight of from about 10,000 to about 40,000 formed by reacting 1-olefin having from about 18 to about 30 carbon atoms with methyl acrylate in the mole ratio of 1:5 to 5:1, respectively, and in the presence of a peroxide catalyst, and thereafter amidizing from 30% to 90% of the ester groups in the polymer with a primary aliphatic diamine.

4. A hydrocarbon oil composition containing a minor amount, sufficient to stabilize said oil against oxidation and sludging, of an oil-soluble polymeric reaction product having a molecular weight of from about 10,000 to about 40,000 formed by reacting octadecene-1 with methyl acrylate in the mole ratio of 1:5 to 5:1, respectively, and in the presence of a peroxide catalyst, and thereafter amidizing from 30% to 90% of the ester groups in the polymer with N,N-dimethylamino propylamine.

5. A fuel oil composition containing a minor amount, sufficient to stabilize said oil against oxidation and sludging, of an oil-soluble polymeric reaction product having a molecular weight of from about 10,000 to about 40,000 formed by reacting octadecene-1 with methyl acrylate in the mole ratio of 1:5 to 5:1, respectively, and in the presence of a peroxide catalyst, and thereafter amidizing from 30% to 90% of the ester groups in the polymer with N,N-dimethylamino propylamine.

6. A mineral lubricating oil composition containing a minor amount, sufficient to stabilize said oil against oxidation and sludging, of an oil-soluble polymeric reaction product having a molecular weight of from 10,000 to 40,000 formed by reacting octadecene-1 with methyl acrylate in the mole ratio of 1:5 to 5:1, respectively, and in the presence of a peroxide catalyst, and thereafter amidizing from 30% to 90% of the ester groups in the polymer with N,N-dimethylamino propylamine.

7. The composition of claim 1 wherein the acid is acrylic acid.

8. The composition of claim 1 wherein the acid is an alpha-alkyl substituted acrylic acid, the alkyl substituent thereof containing no more than 4 carbon atoms.

9. A fuel oil composition containing a minor amount, sufficient to stabilize said oil against oxidation and sludging, of an oil-soluble polymeric reaction product having a molecular weight of from about 10,000 to about 40,000 formed by reacting hexadecene-1 with methyl methacrylate in the mole ratio of 4:1 and in the presence of a peroxide catalyst, and thereafter amidizing about 30% of the ester groups in the polymer with 4-aminopentanamide.

References Cited in the file of this patent

UNITED STATES PATENTS

| | | |
|---|---|---|
| 2,604,453 | Popkin | July 22, 1952 |
| 2,615,845 | Lippincott et al. | Oct. 28, 1952 |
| 2,637,698 | Tutwiler | May 5, 1953 |
| 2,666,044 | Catlin | Jan. 12, 1954 |
| 2,737,452 | Catlin | Mar. 6, 1956 |
| 2,737,496 | Catlin | Mar. 6, 1956 |